(12) United States Patent
Oishi

(10) Patent No.: US 8,176,197 B2
(45) Date of Patent: May 8, 2012

(54) SERVER DEVICE IN CONTENTS TRANSMITTING SYSTEM AND CONTENTS TRANSMITTING METHOD

(75) Inventor: Tomoya Oishi, Saitama (JP)

(73) Assignee: Pioneer Corporation, Tokyo (JP)

( * ) Notice: Subject to any disclaimer, the term of this patent is extended or adjusted under 35 U.S.C. 154(b) by 551 days.

(21) Appl. No.: 12/293,407

(22) PCT Filed: Mar. 26, 2007

(86) PCT No.: PCT/JP2007/056255
§ 371 (c)(1),
(2), (4) Date: Dec. 30, 2008

(87) PCT Pub. No.: WO2007/114107
PCT Pub. Date: Oct. 11, 2007

(65) Prior Publication Data
US 2009/0210551 A1 Aug. 20, 2009

(30) Foreign Application Priority Data
Mar. 30, 2006 (JP) .................................. 2006-094731

(51) Int. Cl.
*G06F 15/16* (2006.01)
(52) U.S. Cl. ........ 709/232; 709/203; 709/223; 709/224; 709/230
(58) Field of Classification Search .................. 709/223, 709/224, 203, 217, 219, 232, 230; 725/91, 725/93, 87, 90, 116, 132, 140, 148; 386/52, 386/68, 95, 109, 46, 55, 98; 382/240, 243
See application file for complete search history.

(56) References Cited

U.S. PATENT DOCUMENTS

| | | | | |
|---|---|---|---|---|
| 5,416,521 A | * | 5/1995 | Chujoh et al. | 375/240.14 |
| 5,719,986 A | * | 2/1998 | Kato et al. | 386/329 |
| 6,061,404 A | * | 5/2000 | Yonemitsu et al. | 375/242 |
| 6,173,012 B1 | * | 1/2001 | Katta et al. | 375/240.15 |
| 6,594,439 B2 | * | 7/2003 | Imahashi et al. | 386/241 |
| 6,650,787 B1 | * | 11/2003 | Takahashi et al. | 382/251 |
| 6,754,715 B1 | * | 6/2004 | Cannon et al. | 709/231 |
| 6,792,449 B2 | | 9/2004 | Colville et al. | |
| 6,842,778 B2 | * | 1/2005 | Murakoshi et al. | 709/217 |
| 6,938,269 B2 | * | 8/2005 | Kajimoto | 725/93 |
| 6,993,689 B2 | | 1/2006 | Nagai et al. | |

(Continued)

FOREIGN PATENT DOCUMENTS
JP        2002-204278 A      7/2002
(Continued)

*Primary Examiner* — Lashonda Jabobs
(74) *Attorney, Agent, or Firm* — Foley & Lardner LLP

(57) ABSTRACT

When the content data recorded in the server device 100 is reproduced in the client device 200 through communication, the contents transmitting system shorten the time to reproduction of content data in reply to a reproduction request from the client device 200. In order to shorten the time up to the reproduction, in the server device 100, a start portion of the content data for an arbitrary time is prepared, which is encoded at a different rate from the encode rate of the content data as for the transmission bandwidth at the previous reproduction of the content data, and it is transmitted to the client device 200 and reproduced at the reproduction starting time. At the time of transmitting the content data, the server device 100 transmits the initial portion of the content data while encoding it for an arbitrary time at real time at a different encode rate as mentioned above, and client device 200 reproduces it.

8 Claims, 14 Drawing Sheets

U.S. PATENT DOCUMENTS

| | | |
|---|---|---|
| 7,342,880 B2 | 3/2008 | Yanagihara et al. |
| 7,346,650 B2 * | 3/2008 | Nomura et al. ............... 709/203 |
| 7,526,522 B2 * | 4/2009 | Iwasaki et al. ............... 709/203 |
| 7,587,503 B2 * | 9/2009 | Sato et al. ..................... 709/229 |
| 7,818,446 B2 * | 10/2010 | Katayama ..................... 709/232 |
| 2003/0123855 A1 * | 7/2003 | Okada et al. .................... 386/98 |
| 2004/0062306 A1 * | 4/2004 | Takahashi et al. ....... 375/240.01 |
| 2006/0101491 A1 * | 5/2006 | Tsuruta et al. ................... 725/58 |
| 2006/0104255 A1 * | 5/2006 | Kido et al. .................... 370/345 |
| 2006/0120698 A1 * | 6/2006 | Kobayashi .................... 386/126 |
| 2006/0233201 A1 * | 10/2006 | Wiesenthal ................... 370/477 |
| 2006/0250908 A1 * | 11/2006 | Takakuwa et al. ........... 369/47.1 |
| 2007/0014544 A1 * | 1/2007 | Kim .............................. 386/112 |
| 2008/0089414 A1 * | 4/2008 | Wang et al. ............... 375/240.13 |
| 2008/0212951 A1 * | 9/2008 | Yamada et al. ............... 386/126 |
| 2008/0281803 A1 * | 11/2008 | Gentric ............................. 707/5 |
| 2009/0103609 A1 * | 4/2009 | Jiang et al. ............... 375/240.03 |

FOREIGN PATENT DOCUMENTS

| | | |
|---|---|---|
| JP | 2003-143583 A | 5/2003 |
| JP | 2003-244695 A | 8/2003 |
| JP | 2003-274401 A | 9/2003 |
| JP | 2004-23548 A | 1/2004 |
| JP | 2004-153616 A | 5/2004 |

* cited by examiner

FIG.12
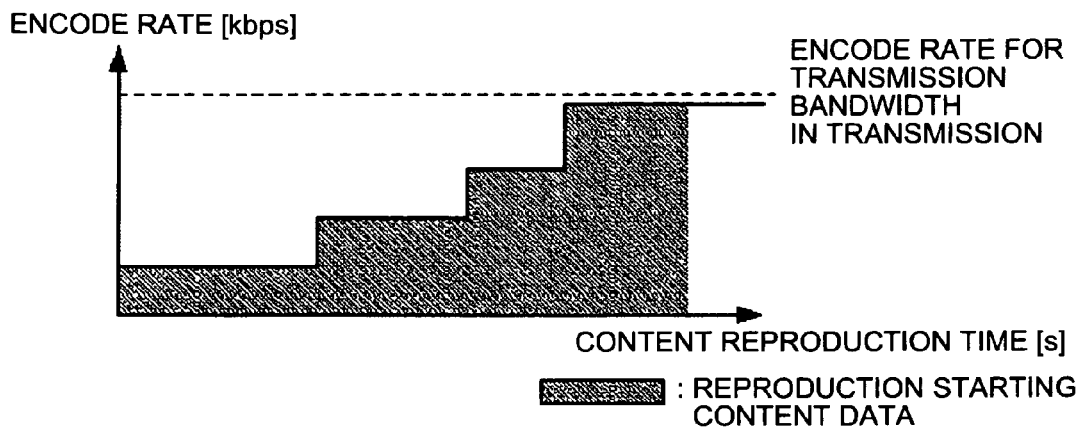
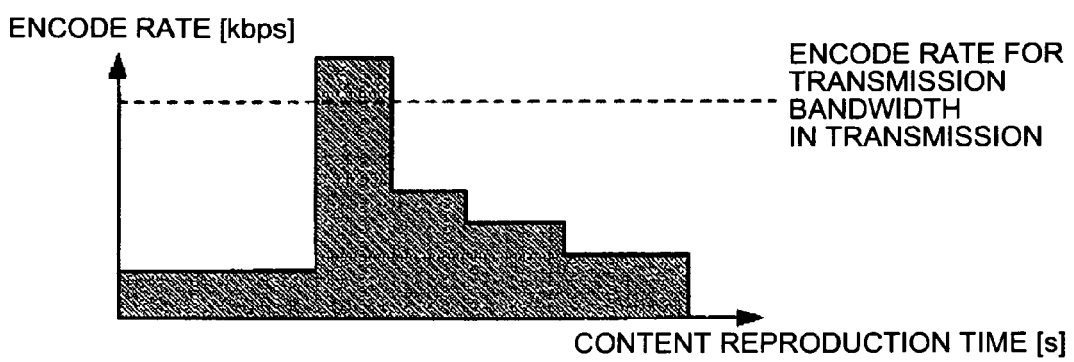
FIG.13
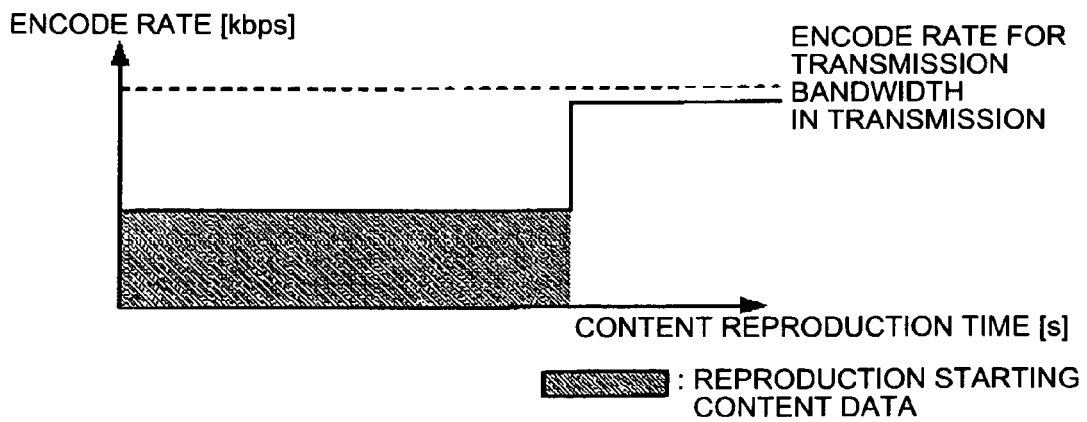

SERVER DEVICE IN CONTENTS TRANSMITTING SYSTEM AND CONTENTS TRANSMITTING METHOD

TECHNICAL FIELD

The present invention relates to a server device in a contents transmitting system and a contents transmitting method.

BACKGROUND ART

Hitherto, there are a method and a device for shortening the starting time of a content which an end user experiences, in a system of transmitting and receiving stream data through a network (Patent Document 1).

The method and the device disclosed in Patent Document 1 are formed as shown in Patent Document 1 in FIG. 2, and upon receipt of a content request from a client device, a server device transmits a start portion of a content to be streamed at a higher rate than an encode rate of the content and transmits the other portion than the start portion at the encode rate. Thanks to this, the client device can buffer the above start portion in a shorter time than a start portion encoded at the encode rate of the content Therefore, the client device can reproduce the content at a higher speed.

Patent Document 1: Japanese Patent Application Laid-open No. 2003-143583

DISCLOSURE OF INVENTION

Problem to be Solved by the Invention

In the above-mentioned method and device disclosed in Patent Document 1, however, when the bandwidth at a transmission starting time is close to the encode rate of a content, a server device cannot transmit the content at a transmission rate higher than its encode rate. As a result, a client device cannot buffer the content start portion for a short time easily. Namely, there is such a problem that a quick reproduction of a content is impossible. The above problem is an example of the problems to be solved by the invention.

The present invention has been made in consideration of the above problem, and its object is to provide a server device in a contents transmitting system and a contents transmitting method which can shorten the time upto the reproduction of content in a client device, by transmitting data of a transmission start portion of the content encoded at an encode rate different from an original encode rate of the content in the server device.

Means for Solving Problem

To solve the above problem and achieve the above object, one embodiment is a server device in a contents transmitting system having the server device and a client device connected to each other through a network in a communicable way, for transmitting content data recorded in the server device to the client device, wherein the server device includes an encode parameter deciding unit that decides encode parameters of a reproduction start portion of the content data so as to be a different encode rate from an encode rate for a transmission bandwidth in the network, an encoder that encodes the reproduction start portion in the encode parameters, and a recording unit that stores the reproduction start portion encoded in the encoder, wherein the server device transmits the reproduction start portion stored in the recording unit to the client device, when the server device receives a reproduction request of the content data from the client device, encodes the portion other than the reproduction start portion of the content data at the encode rate for the transmission bandwidth in the network, and transmits the encoded portion to the client device.

Further, one embodiment provides a contents transmitting method using a contents transmitting system having a server device and a client device connected to each other through a network in a communicable way, for transmitting content data recorded in the server device to the client device, wherein the method includes an encode parameter deciding step of deciding encode parameters of a reproduction start portion of the content data so as to be a different encode rate from an encode rate for a transmission bandwidth in the network, an encode step of encoding the reproduction start portion in the encode parameters, and a recording step of storing the reproduction start portion encoded in the encoder, wherein the server device transmits the reproduction start portion stored in the recording unit to the client device, when the server device receives a reproduction request of the content data from the client device, encodes the portion other than the reproduction start portion of the content data at the encode rate for the transmission bandwidth in the network, and transmits the encoded portion to the client device.

BRIEF DESCRIPTION OF DRAWINGS

FIG. 12 is a concept view showing one example of reproduction starting content data for reproducing the content data as well as for deciding the encode rate, according to elapse of time.

FIG. 13 is a concept view showing one example when the portion of the reproduction starting content data is encoded at a constant encode rate.

EXPLANATIONS OF LETTERS OR NUMERALS

Figure 1:
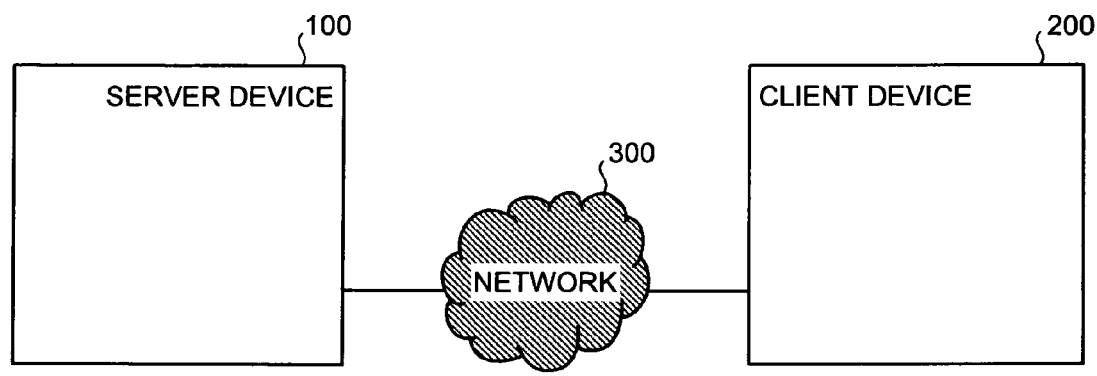
FIG. 1 is a view of system structure according to an embodiment.

100 sever device
102 content data input unit
104 recording unit
106 history recording unit
108 encode parameter deciding unit
110 encode parameter setting unit
112 encoder
114 transmitting unit
116 receiving unit
118 control unit
200 client device
202 receiving unit
204 buffer unit
206 decoder
208 display unit
210 transmitting unit
212 control unit
300 network

BEST MODE(S) FOR CARRYING OUT THE INVENTION

The following describes an embodiment of a server device in a contents transmitting system and a contents transmitting method according to the present invention in detail with reference to the drawings. The embodiment is illustrative only, and is not intended to limit the present invention in any way.

Overview of the Embodiment

The following outlines the present embodiment, and then, a configuration and processing of the present embodiment are explained in detail. FIG. 1 is a view of system structure according to the embodiment.

The present embodiment relates to a contents transmitting system having a server device 100 and a client device 200 connected to each other through a network 300 in a communicable way, for transmitting content data recorded in the server device 100 to the client device 200.

The contents transmitting system according to the embodiment thus constituted can shorten the time to reproduction of content data in reply to a reproduction request from the client device 200 when the content data (for example, program and scene) recorded in the server device 100 (for example, hard disk recorder and PC) is reproduced in the client device 200 (for example, PC and portable terminal such as PDA) through communication.

Namely, the server device 100 of the embodiment includes an encode parameter deciding unit that decides encode parameters of a reproduction start portion of the content data so as to be a different encode rate from an encode rate for a transmission bandwidth in the network, and an encoder that encodes the reproduction start portion in the encode parameters.

Here, the encode parameter deciding unit may decide the encode parameters so that an average encode rate in a reproduction time of the reproduction start portion becomes lower than the encode rate for the transmission bandwidth in the network, and may decide the encode parameters so as to increase the encode rate according to elapse of the reproduction time of the reproduction start portion.

The encode parameter deciding unit may decide the encode parameters previously set as the encode parameters of the reproduction start portion.

The server device 100 may further include a history recording unit that stores the encode rate in the past transmission of the other content data than the above content data as encode rate information, and the encode parameter deciding unit may decide the encode parameters in the reproduction start portion based on the encode rate information stored in the history recording unit.

The server device 100 further may include a history recording unit that stores encode rate information of the content data when end, suspension, or interruption of the content data occurs, and the encode parameter deciding unit may decide the encode parameters in the reproduction start portion based on the encode rate information stored in the history recording unit.

The encode parameter deciding unit may decide the encode parameters in the reproduction start portion based on the content data information obtained by analysis of the content data and the encode rate information stored in the history recording unit.

In short, according to the embodiment, in order to shorten the time up to the reproduction, in the server device 100, a start portion of the content data for an arbitrary time is prepared, which is encoded at a different rate (for example, lower) from the encode rate of the content data as for the transmission bandwidth at the previous reproduction and the like of the content data, and it is transmitted to the client device 200 at the reproduction starting time. At the time of transmitting the content data, the server device 100 transmits the initial portion of the content data while encoding it for an arbitrary time at real time at a different encode rate as mentioned above.

Here, the content data start portion for the arbitrary reproduction time that is encoded at the different rate from the encode rate according to a transmission bandwidth in a network is referred to as "reproduction starting content data". The server device 100 transmits the reproduction starting content data encoded at the different encode rate to the transmission bandwidth, at the transmission starting time. A receiving buffer of the client device 200 receives the data necessary for displaying the content data in a short time to reproduce the content data. Therefore, the content data can be displayed quickly. This can reduce user's stress in waiting for reproduction at the playback.

Next, the reason why the reproduction starting time can be speeded up in the client device 200 by encoding and transmitting the reproduction starting content data according to the embodiment will be described in detail with reference to FIGS. 2 to 5.

Figure 2:
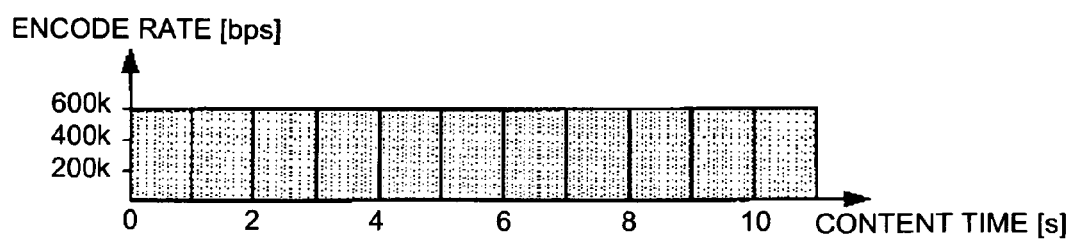
FIG. 2 is a concept view when encoding content data at an encode rate of 600 kbps.

At first, the content data encoded as shown in FIG. 2 is transmitted as the transmission content data. FIG. 2 is a concept view when encoding content data at an encode rate of 600 kbps.

In the embodiment, as for the encode parameters, an encode rate of the reproduction starting content data may be decided according to elapse of the reproduction time of the reproduction starting content data (for example, in the increasing order). For example, when the reproduction start portion is encoded according to the embodiment, the content data to be transmitted becomes as shown in FIG. 3.

Figure 3:
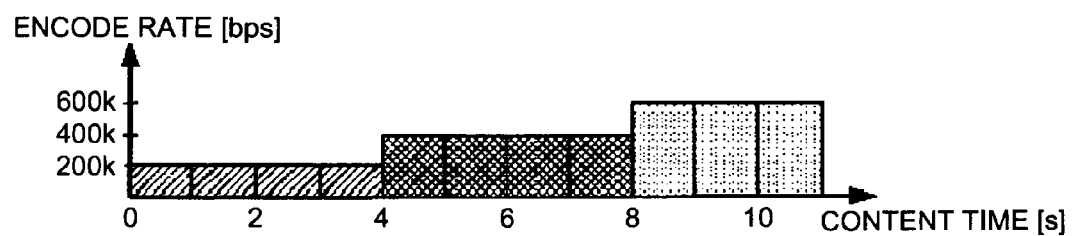
FIG. 3 is a concept view showing one example when the portion for initial four seconds is encoded at 200 kbps and the portion for the next four seconds is encoded at 400 kbps.

FIG. 3 is a concept view showing one example when the portion for initial four seconds is encoded at 200 kbps and the portion for the next four seconds is encoded at 400 kbps.

In the embodiment, by transmitting the content data encoded as shown in FIG. 3 and by receiving the data necessary for reproduction quickly in the receiving buffer of the client, the time to start the reproduction is shortened. At that time, transmission of the content data in the server device 100 is performed as shown in FIG. 4.

Figure 4:
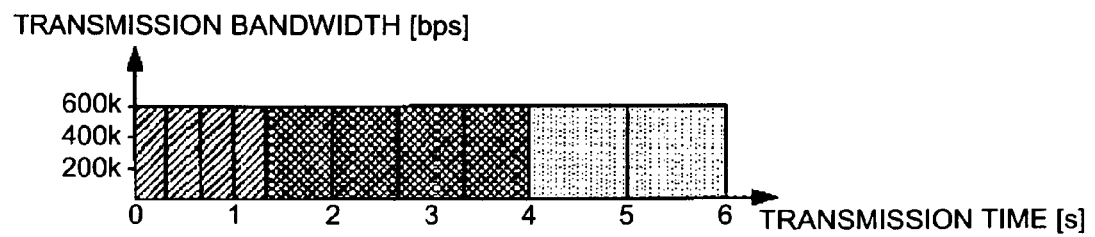
FIG. 4 is a concept view showing one example when a server device 100 transmits content data.

As shown in FIG. 4, the server device 100 transmits the content data for three seconds of the reproduction time, in the initial one second, in the transmission bandwidth as shown in FIG. 4 when creating the content data as shown in FIG. 3.

According to this, the receiving buffer of a client can receive the content data for three seconds of the reproduction time only in the initial one second. Here the client device 200 can reproduce the content data immediately by buffering the content data for three seconds in the receiving buffer and reproducing it.

In a state where the transmission bandwidth is close to an encode rate, when the content data was transmitted at this encode rate (600 kbps in FIG. 2), it takes three seconds to receive the content data for three seconds and the content data will be reproduced after three seconds.

As for the encoding in the server device 100, when the reproduction starting content data according to the embodiment is previously prepared, the data may be transmitted as it is as shown in FIG. 4, but when the content data is created at real time at the transmission time and transmitted, not the encoding at the normal encode speed (hereinafter, described as "constant encode") but the quicker encode (hereinafter, described as "n-times quick encode") is performed.

According to this, since the content data can be encoded quickly in a shorter time with respect to the content data time (the length of the content data), the content data can be transmitted as shown in FIG. 4.

Figure 5:
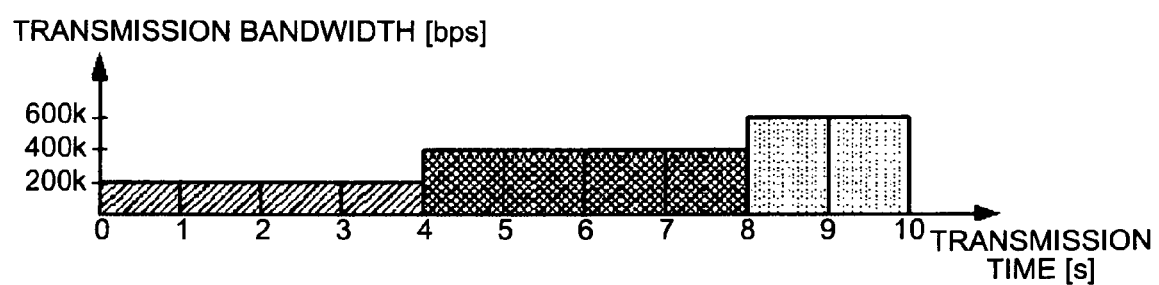
FIG. 5 is a concept view showing one example of content data transmission when the content data is encoded at a constant encode rate and transmitted.

Here, when the content data is encoded at the constant encode not at the n-times quick encode and transmitted, the transmission of the content data becomes as shown in FIG. 5. Even when the reproduction start portion is encoded at the different rate, since the content data for the next time is not created in FIG. 5, the content data cannot be transmitted as shown in FIG. 4. Therefore, when the content data is created at real time and transmitted, the n-times quick encode should be performed, and the content data is transmitted.

[Configuration of the System]

Figure 6:
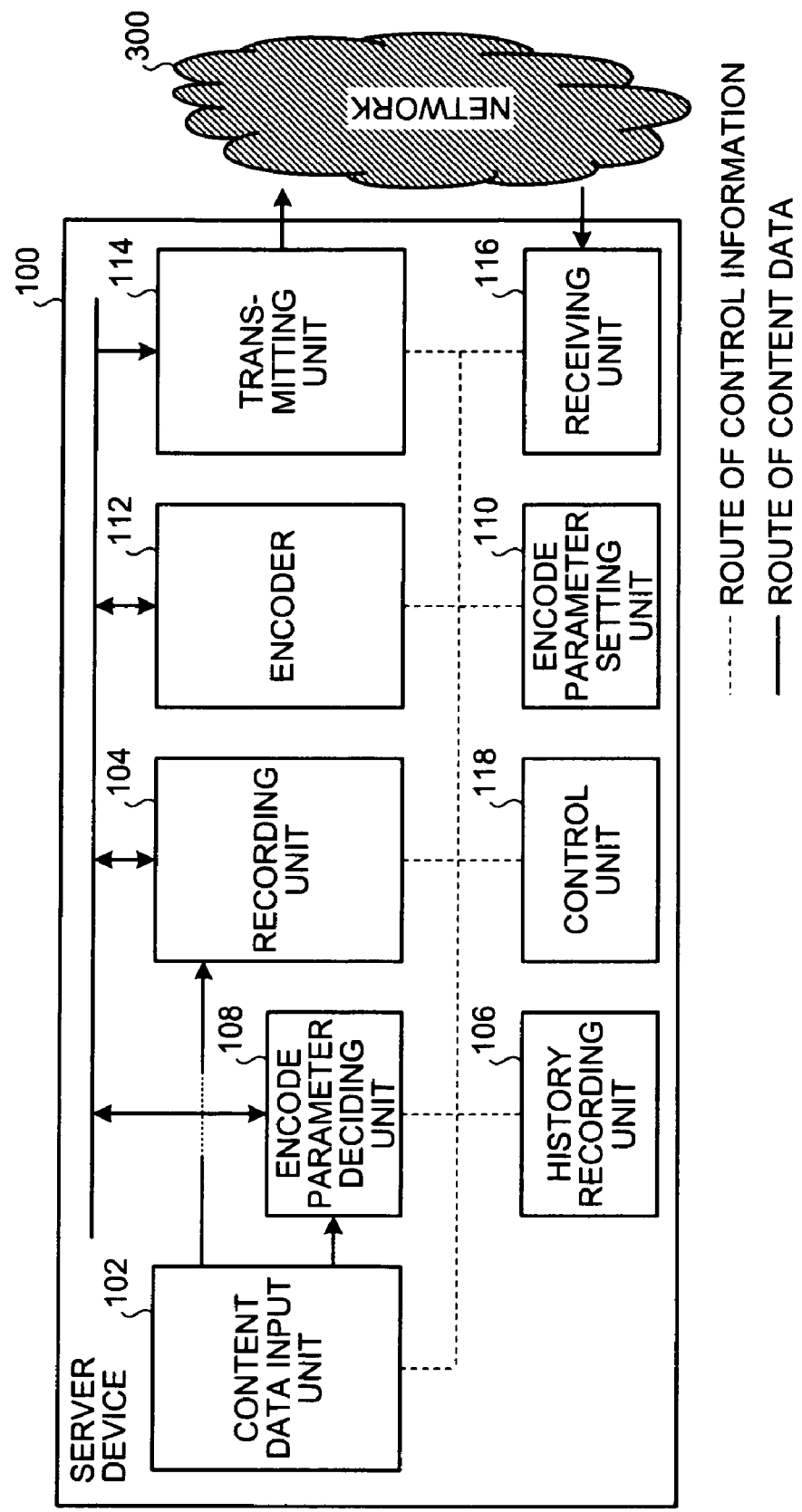
FIG. 6 is a block diagram showing one example of the structure of the server device 100 of the system to which this embodiment is applied.

Next, a configuration of the system will be described with reference to FIGS. 6 and 7. FIG. 6 is a block diagram showing one example of the structure of the server device 100 of the system to which this embodiment is applied, and conceptually shows only parts related to the embodiment.

In FIG. 6, in general, the server device 100 includes a content data input unit 102, a recording unit 104, a history recording unit 106, an encode parameter deciding unit 108, an encode parameter setting unit 110, an encoder 112, a transmitting unit 114, a receiving unit 116, and a control unit 118. These components are communicably connected to each other.

As illustrated in FIG. 6, of the respective components of the server device 100, a content data input unit 102 has a function of entering the content data from a tuner, DEMUX for receiving the content data and a storing medium such as disc.

A recording unit 104 has a function of recording the input content data. When previously keeping the reproduction starting content data, the recording unit 104 has a function of recording the reproduction starting content data.

A history recording unit 106 has a function of keeping a history of encode rate information set at the time of transmitting the content data to the client device (start, midstream, end/suspension/interruption and the like).

An encode parameter deciding unit 108 has a function of deciding encode parameters including encode rate of the reproduction starting content data and the reproduction time, according to the history of the encode rate information or the content data information obtained by analysis of the content data.

An encode parameter setting unit 110 has a function of keeping the encode parameters decided by the encode parameter deciding unit 108 and setting the encode parameters for the content in an encoder 112 at the time of obtaining a content reproduction request.

The encoder 112 has a function of encoding the reproduction start content data according to the encode parameters. It has a function of encoding the portion other than the reproduction starting content data, of the content data.

A transmitting unit 114 has a function of transmitting the reproduction starting content data and the portion other than the reproduction starting content data, of the content data, to the client device 200.

A receiving unit 116 has a function of receiving a request from the client device 200.

A control unit 118 has a function of controlling each unit.

Figure 7:
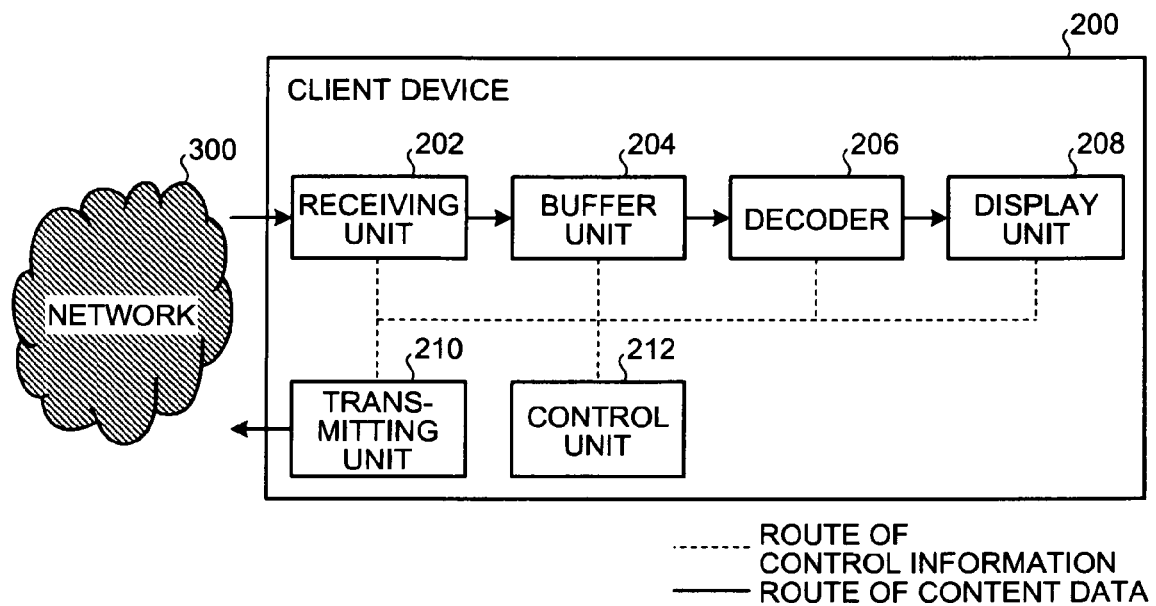
FIG. 7 is a block diagram showing one example of the structure of the client device 200 of the system to which this embodiment is applied.

Next, FIG. 7 is a block diagram showing one example of the structure of the client device 200 of the system to which this embodiment is applied, and conceptually shows only parts related to the embodiment.

In FIG. 7, in general, the client device 200 includes a receiving unit 202, a buffer unit 204, a decoder 206, a display unit 208, a transmitting unit 210, and a control unit 212. These components are communicably connected to each other.

As illustrated in FIG. 7, out of the respective components of the client device 200, a receiving unit 202 has a function of receiving the reproduction starting content data and the portion other than the reproduction starting content data, of the content data.

A buffer unit 204 has a function of buffering the reproduction starting content data and the portion other than the reproduction starting content data, of the received content data.

A decoder 206 has a function of decoding the reproduction starting content data and the portion other than the reproduction starting content data, of the content data.

A display unit 208 has a function of displaying the reproduction starting content data and the portion other than the reproduction starting content data, of the decoded content data.

A transmitting unit 210 has a function of transmitting a client request.

A control unit 212 has a function of controlling each unit.

The detailed processing performed by these units will be described later.

[Processing of the System]

The following describes in detail a processing of the system according to the present embodiment as configured above with reference to FIGS. 8 to 14.

Figure 8:
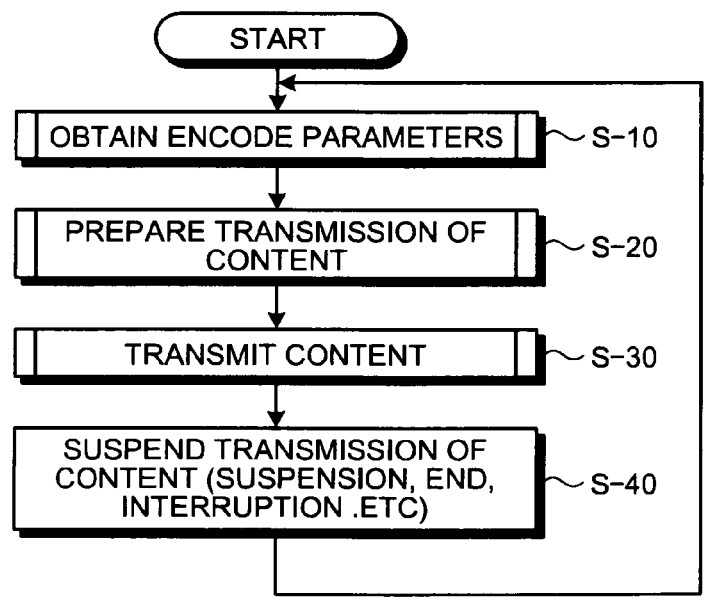
FIG. 8 is a flow chart showing one example of the operation processing in the system according to the embodiment.

FIG. 8 is a flow chart showing one example of the operation processing in the system according to the embodiment.

There are a case (case 1) of previously preparing the reproduction starting content data and transmitting it and a case (case 2) of creating it at real time at the transmission time and transmitting it, in the following operations.

As illustrated in FIG. 8, at first, the server device 100 obtains the encode parameters (Step S-10).

Figure 9:
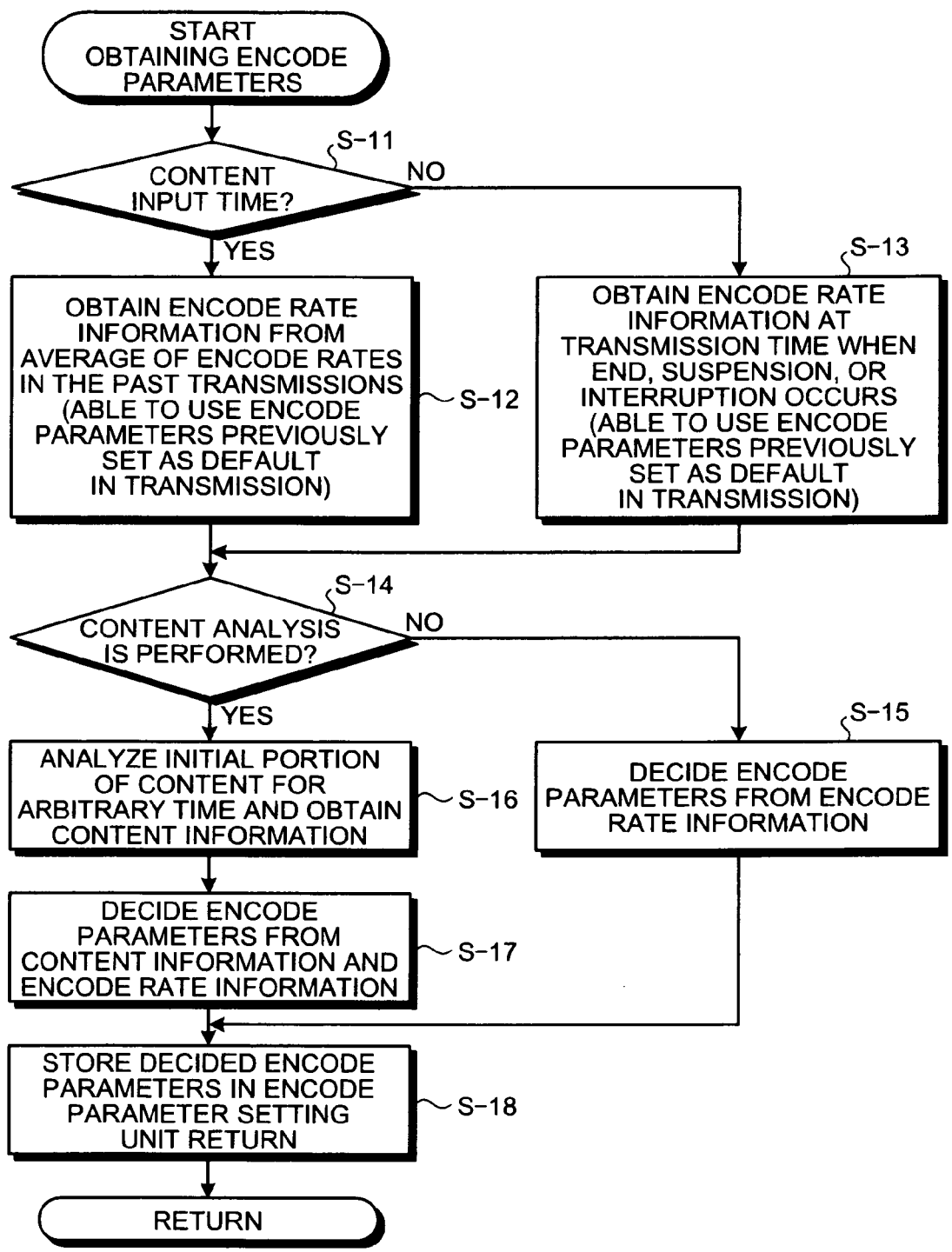
FIG. 9 is a flow chart showing one example of the operation for obtaining encode parameters in the server device 100.

Here, an operation for obtaining encode parameters in Step S-10 will be described with reference to FIG. 9. FIG. 9 is a flow chart showing one example of the operation for obtaining encode parameters in the server device 100.

When the content input unit 102 receives the content data and when the end, suspension, or interruption of the content data occurs at the time of transmitting the content data, the encode parameters are obtained.

First, when the content data is entered in the content input unit 102 (Step S-11), the content data is recorded in the recording unit 104 and the initial portion for an arbitrary time is entered in the encode parameter deciding unit 108.

The encode parameter deciding unit 108 obtains the encode rate information at the time of transmitting the content data through the history recording unit 106 (Step S-12). The encode rate information obtained at this time includes for example, the average of the encode rates in the past transmissions.

The encode parameter deciding unit 108 decides the encode parameters of the reproduction starting content data according to the encode rate information and the content data information as a result of analyzing the input content data (Steps S-14, and S-16 to S-18).

The encode parameter deciding unit 108 can decide the encode parameters only according to the encode rate information (Steps S-14 to S-15). The encode parameters may be previously set as default at the transmission time.

When the end, suspension, or interruption of the content data occurs at the time of content data transmission (Step S-11), the encode parameter deciding unit 108 obtains the encode rate information at the end, suspension, or interruption time through the history recording unit 106 (Step S-13).

The initial portion in the next transmission of the content data for an arbitrary time is obtained from the recording unit 104 and analyzed to obtain the content data information (Steps S-14 and S-16), and the encode parameters are decided according to the above information and the obtained encode rate information (Step S-17).

At this time, only the encode rate information can decide the encode parameters (Steps S-14 and S-15). The encode parameters may be previously set as default in the transmission.

After deciding the encode parameters, the encode parameter setting unit 110 holds the decided encode parameters and sets the encode of the initial portion of the content data by using the above encode parameters (Step S-18).

Then, the operation for obtaining encode parameters in the server device 100 is ended.

Going back to FIG. 8 again, the server device 100 prepares for transmission of the content (Step S-20).

Figure 10:
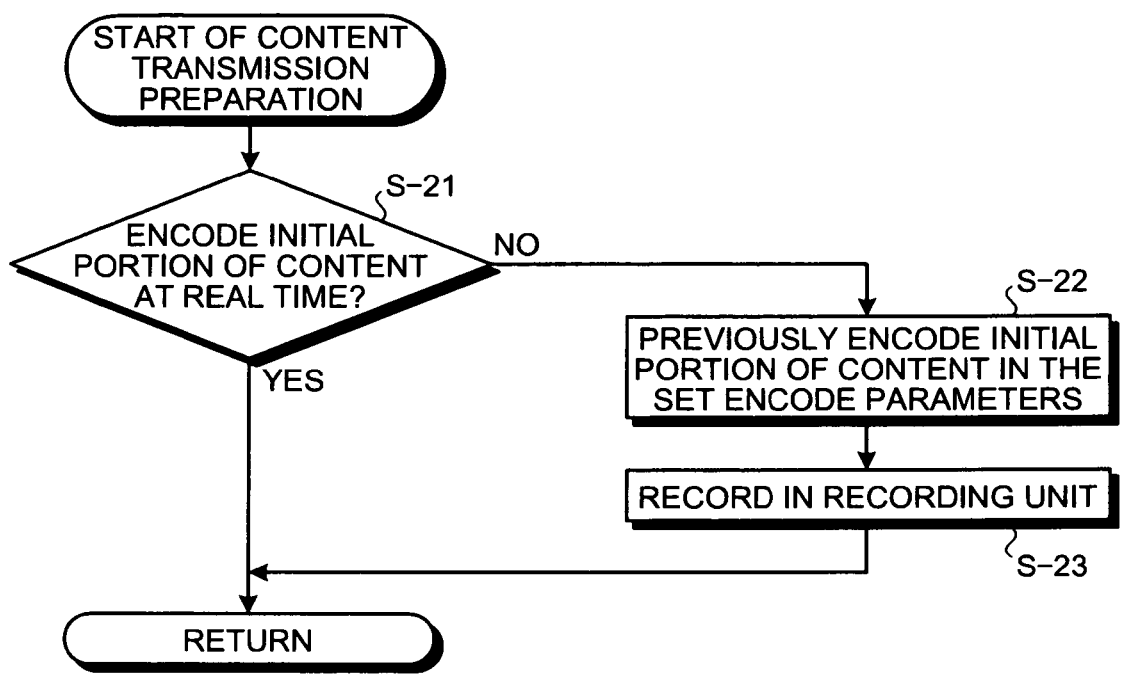
FIG. 10 is a flow chart showing one example of the operation for preparing for transmission of a content in the server device 100.

Here, an operation for preparing for transmission of a content in Step S-20 will be described with reference to FIG. 10. FIG. 10 is a flow chart showing one example of the operation for preparing for transmission of a content in the server device 100.

In the case 1 (in the case of NO in Step S-21) when a reproduction starting content is created at the time of inputting the content data, the reproduction starting content data is previously created simultaneously with the input of the content data. On the other hand, when the reproduction starting content data is created at the time of end, suspension, or interruption, it is created just after setting the encode parameters for the next transmission.

As for the case 1, when the encode parameters are set in the encode parameter setting unit 110, the initial portion of the content data is previously encoded for an arbitrary time (Step S-21: No, Step S-22).

The encoded data is regarded as the reproduction starting content data and stored in the recording unit 104 (Step S-23).

As for the case 2 (in the case of YES in Step S-21), when the content data is input, it is stored in the recording unit 104. When a content reproduction request is obtained from the client device 200, the server device 100 decides the encode parameters at real time, encodes the initial portion of the content according to the decided encode parameters, and transmits it.

Then, the operation for preparing for transmission of content in the server device 100 is ended.

Going back to FIG. 8 again, the server device 100 performs the transmission of the content (Step S-30).

Figure 11:
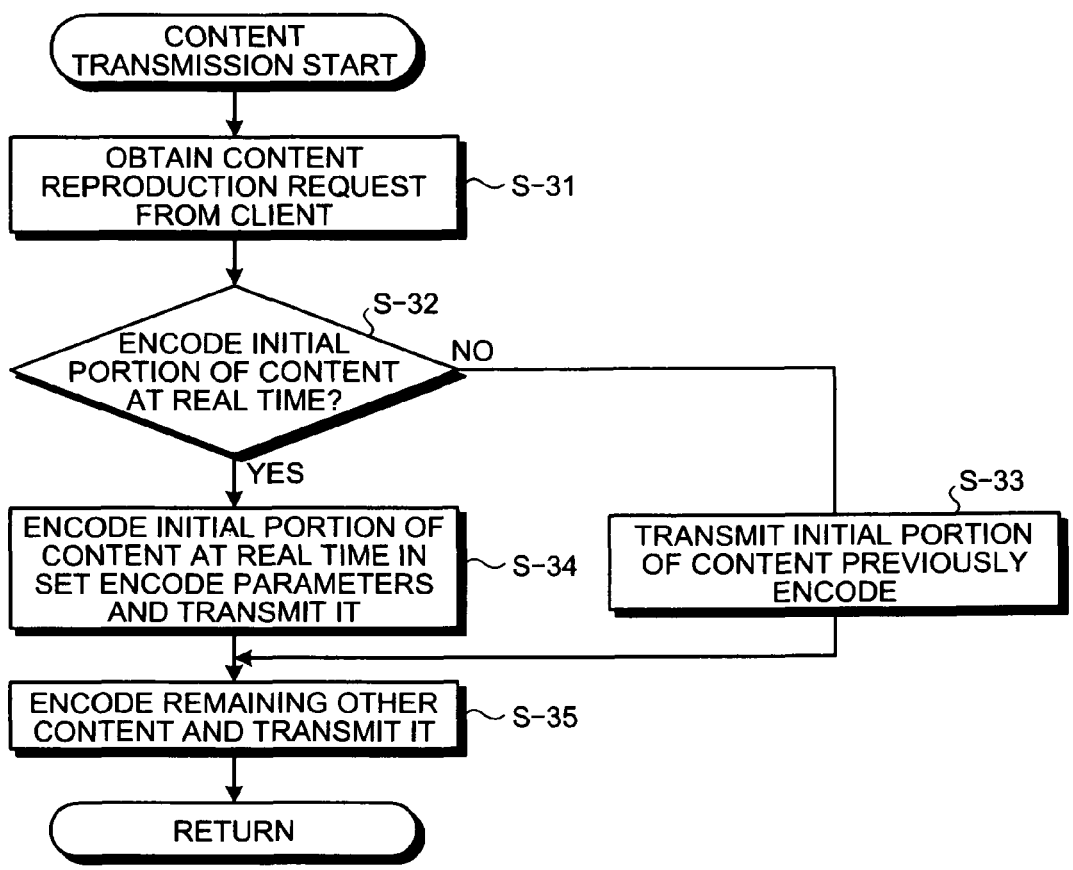
FIG. 11 is a flow chart showing one example of the operation for transmission of a content in the server device 100.

Here, an operation for transmission of a content in Step S-30 will be described with reference to FIG. 11. FIG. 11 is a flow chart showing one example of the operation for transmission of a content in the server device 100.

When the transmitting unit 210 of the client device 200 transmits a reproduction request and the receiving unit 116 of the server device 100 receives it (Step S-31), the server device 100 transmits the requested content data to the client device according to the following operation.

Transmission of the content data is in the following two cases: case 1 and case 2 as described above (Step S-32).

In the case 1, just after receiving a content data reproduction request, the reproduction starting content data of the content data which is stored in the recording unit 104 is transmitted from the transmitting unit 114 (Step S-33).

After transmitting the reproduction starting content, the server device 100 encodes the portion other than the reproduction starting content data, of the content data, in the encoder 112 and subsequently transmits it (Step S-35).

On the other hand, in the case 2, after receiving the content data reproduction request, it enters the content data stored in the recording unit 104, in the encoder 112, and encodes it at real time. It transmits the encoded data from the transmitting unit 114 as it is (Step S-34).

At this time, the encode parameters for the initial arbitrary time of the content data are the ones which have been set in the encode parameter setting unit 110 as the encode parameters of the reproduction starting content data.

Upon receipt of the content data, the client device 200 enters it into the buffer unit 204. When the buffer unit 204 receives the necessary amount of the data for decoding the content data, it enters the above into the decoder 206 and a client displays the decoded data on the display unit 208.

Then, the operation for transmission of a content in the server device 100 is ended.

Going back to FIG. 8 again, when the end, suspension, or interruption of the content data occurs at the time of transmitting the content data, going back to Step S-10, the server device 100 repeats the operation (Step S-40).

Then, the processing operation of the system is ended.

As mentioned above, the embodiment shortens the time up to the reproduction of the content data by encoding the transmission content data for the initial arbitrary time by the acquired encode parameters and transmitting the portion.

The encode parameters are acquired in the encode parameter deciding unit 108 from the encode rate information of the history recording unit 106 and the content data information obtained by analyzing the content data, as mentioned above.

Here, the content data information is acquired by analyzing the transmission content data for the initial arbitrary time. It includes an encoding method, bit rate, frame rate, picture size, and compression information (information for use in compression such as Q value, encode amount, motion vector, and the like) of the content data.

The encode rate information is the information on the encode rate of the content data as for the transmission bandwidth in the previous transmission (start, midstream, end/suspension/interruption, and the like) and the average of their past encode rates.

According to the above information, encode parameters such as encoding at an encode rate different from (for example, lower than) the encode rate of the content data in the transmission bandwidth at the transmission time are acquired.

One example of the concept of the reproduction starting content data encoded with the encode parameters according to the embodiment is shown in FIGS. 12 and 13.

FIG. 12 is a concept view showing one example of reproduction starting content data for reproducing the content data as well as for deciding the encode rate, according to elapse of time. The top view in FIG. 12 shows one example of the reproduction starting content data that is decided in an ascending order of the encode rate according to elapse of time, and the bottom view in FIG. 12 shows one example of the reproduction starting content data that has a portion of high encode rate temporarily but whose whole size is smaller than the original size, according to elapse of time.

By the server device 100 transmitting the reproduction starting content data at the transmission starting time, the receiving buffer of the client device 200 receives the necessary data for displaying the content in a short time. As a result, a client can display the content quickly. Thus, it can reduce user's stress in waiting for the reproduction at the reproduction time.

FIG. 13 is a concept view showing one example when the portion of the reproduction starting content data is encoded at a constant encode rate.

In the examples of FIGS. 12 and 13, the encode rate of the remaining content data after the reproduction starting content data becomes substantially equal to the transmission bandwidth.

The client device 200 enters the reproduction starting content data into the buffer unit 204, stores the data amount necessary for displaying the content data, then, decodes it in the decoder 206, and displays it on the display unit 208.

When the buffer unit 204 receives and decodes the data for an arbitrary size, the reception of the encoded data such as the reproduction starting content data can receive the data for a longer time than the reception of the content data encoded at a rate for the transmission bandwidth at the transmission time. Namely, considering the reception of the data for the same reproduction time, the reception of the reproduction starting content data can obtain the same reproduction time in a smaller size. Thus, the threshold of the data amount in the receiving buffer necessary for displaying the content data can be decreased.

Figure 14:
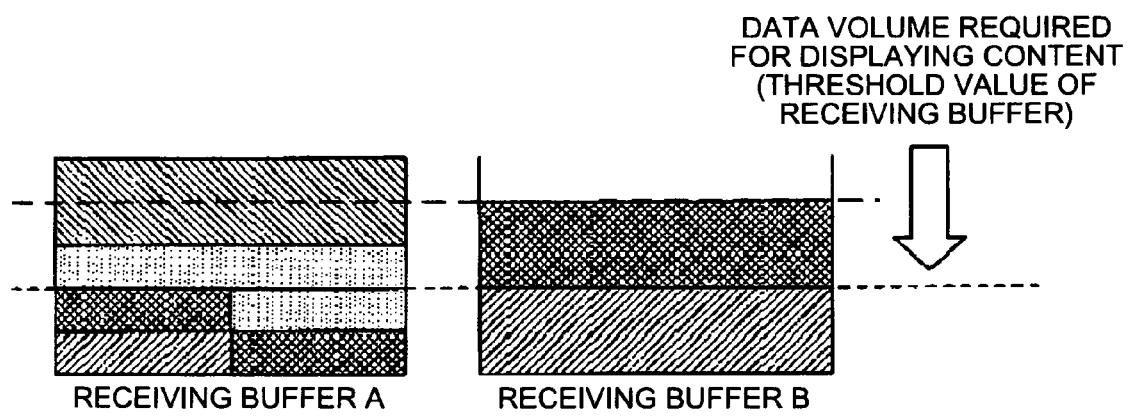
FIG. 14 is a concept view showing one example of the status of use in a buffer unit 204 when the content data is received.

Here, FIG. 14 is a concept view showing one example of the status of use in a buffer unit 204 when the content data is received.

The receiving buffer A in FIG. 14 shows a state in which it receives the reproduction starting content data encoded according to the embodiment. On the other hand, the receiving buffer B shows a state in which it receives the content data encoded at a normal rate for the transmission bandwidth at the transmission time.

In FIG. 14, as an example, assume that the same patterns (hatch) within the receiving buffers respectively represent the data size for two seconds, with respect to the patterns within the receiving buffer.

When displaying the content data in the dotted line on FIG. 14, the receiving buffer A stores the content data for seven seconds at that point but the receiving buffer B stores the content data for four seconds.

Here, when displaying the content data at the time of storing the content data size for four seconds, the receiving buffer A can display the content data when receiving the content data for the position of the lower dotted line. Namely, the buffer A displays the content data through the reception of the data of smaller size compared with the buffer B.

Therefore, in the receiving buffer A, by encoding and transmitting the content data for the initial arbitrary time as the reproduction starting content data, the data necessary for displaying the content data can be received in a short time. As a result, the time up to display of the content data can be shortened.

Namely, in the embodiment, the above mentioned effects are taken by encoding the data of the transmission start portion of the content data at a rate different from the encode rate set at the transmitting time (start, midstream, end/suspension/interruption, and the like) of the content data.

Here, the encode rate of the data of the transmission start portion may be acquired according to the history information of the encode rate at the time of transmitting the content data, the encode parameters acquired based on the analysis information of the content data itself, or the encode parameters previously set as default at the transmission time.

Simultaneously with recording the content data into the recording unit 104, the encode rate of the data for the transmission start portion may be acquired.

On the other hand, after the content data reproduction request, the data for the transmission start portion is encoded at real time by using the encode rate and the data for the transmission start portion may be transmitted as it is. When it is not transmitted at real time, the data of the transmission start portion may be previously encoded at the acquired encode rate and stored and then, it may be transmitted at the time of the content data reproduction request.

Thus, since the data of the transmission start portion of the content data is encoded at an encode rate different from (for example, lower than) the encode rate of the content data and then transmitted, the receiving buffer can receive the content data necessary for reproduction quickly, hence to shorten the time up to the reproduction of the content data. Even when the bandwidth at the transmission starting time is close to the encode rate of the content data, the receiving buffer can receive the content data necessary for the reproduction quickly and reproduce the content data more speedily.

By the server device's transmitting the reproduction starting content data, the receiving buffer of the client device 200 can receive the content data for a longer period of time as for an arbitrary buffer size. This is because the reproduction starting content data is smaller size compared with the data encoded at the original encode rate (the encode rate of the other portion than the reproduction starting content data of the content). When some contingency occurs such as breakdown of communication at the time of transmitting the reproduction starting content data after starting the transmission, the time to the interruption of the reproduction can be reserved for a long time.

In reply to a user's request for content data reproduction, the content data can be reproduced more quickly, hence to reduce the stress of waiting for the reproduction at the playback.

First Embodiment

Figure 15:
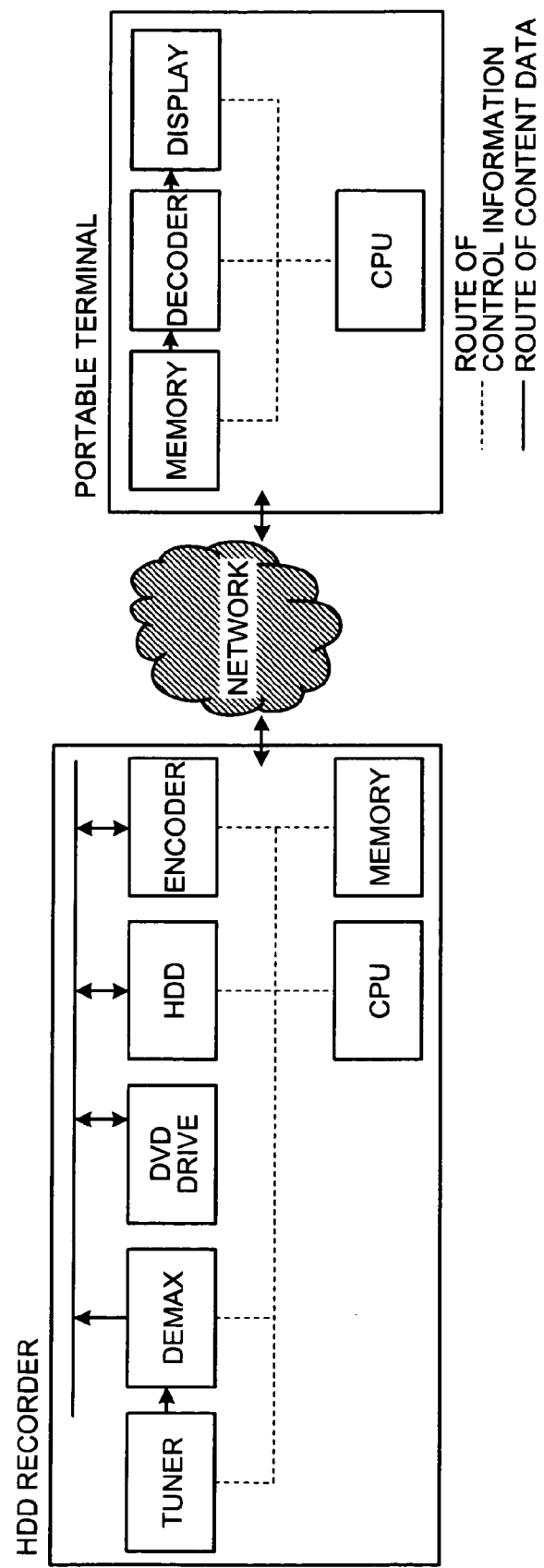
FIG. 15 is a view showing the outline of a first embodiment of a contents transmitting system according to this invention.

FIG. 15 is a view showing the outline of a first embodiment of a contents transmitting system according to this invention. A first embodiment will be described, by way of example, when an HDD (hard disk) recorder is used as the server device 100 and a portable terminal for receiving the content data of the HDD recorder through a network (cellar phone network, wireless LAN, and the like) is used as the client device 200.

Here, the HDD (hard disk) recorder includes an HDD recorder with a DVD drive mounted and a PC with a TV tuner board mounted.

The HDD recorder records the content data received by a tuner and the content data recorded in a DVD into the HDD and simultaneously obtains parameters for encoding the initial data of the above for an arbitrary time.

The encode parameters are obtained from the information obtained by analyzing the initial portion of the content data for the arbitrary time and the previous encode rate in the past transmission of the content data.

These are parameters for encoding the data at an encode rate different from (for example, lower than) the supposed bandwidth in the transmission.

The HDD recorder previously encodes the initial portion of the content data for the arbitrary time in the acquired encode parameters and records it in the HDD.

Upon receipt of the content data reproduction request from the portable terminal, the HDD recorder transmits the requested content data to the portable terminal.

At this time, the HDD recorder transmits the initial portion of the content data encoded in the HDD. Then, the HDD recorder transmits the content data other than the initial portion. Receiving the content data, the portable terminal decodes and displays it.

When the content data is suspended, finished, or interrupted during its reproduction, the HDD recorder encodes the next initial portion of the content data for the next reproduction.

The encode parameters at that time are obtained according to the encode information about the content data at the time of its suspension, end, or interruption and the content data analytical information for an arbitrary time based on the position of the next reproduction of the content data at that time.

The HDD recorder encodes the initial portion of the next reproduction in the acquired parameters in advance and records it into the HDD.

Upon receipt of the next reproduction request of the content data from the portable terminal, it transmits the initial portion of the previously encoded content data similarly.

Second Embodiment

Figure 16:
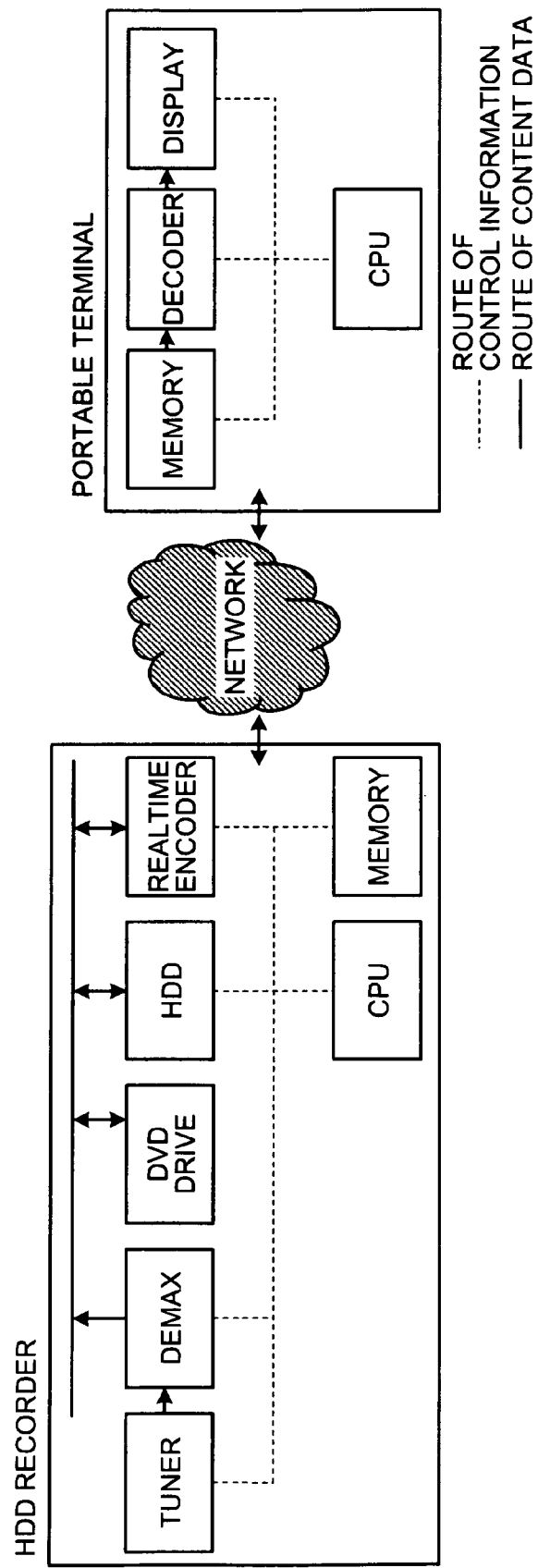
FIG. 16 is a view showing the outline of a second embodiment of a contents transmitting system according to this invention.

FIG. 16 is a view showing the outline of a second embodiment of a contents transmitting system according to this invention. A second embodiment will be described, by way of example, when an HDD (hard disk) recorder is used as the server device 100 and a portable terminal for receiving the content data of the HDD recorder through a network (cellar phone network, wireless LAN, and the like) is used as the client device 200.

Here, although in the above mentioned first embodiment, the initial portion of the content to be transmitted is previously encoded, the case of encoding the initial portion of the content data at real time in the acquired encode parameters, upon receipt of the content data reproduction request from the portable terminal and transmitting it, will be described as one example, in the second embodiment.

The case of acquiring the encode parameters previously at the time of the content data input similarly to the first embodiment, and storing it in a memory or a HDD will be described as one example. At first, upon receipt of the content data reproduction request from the portable terminal, the HDD recorder transmits the requested content data to the portable terminal. At this time, the HDD recorder encodes the initial portion of the content data at real time in the acquired encode parameters and transmits the above.

Then, the HDD recorder transmits the content data other than the initial portion. Receiving the content data, the portable terminal decodes and displays it.

When the content data is suspended, finished, or interrupted during its reproduction, the HDD recorder obtains the encode parameters of the content data for the next reproduction.

The encode parameters at that time are obtained according to the encode information about the content data at the time of its suspension, end, or interruption and the content data analytical information for an arbitrary time based on the position of the next reproduction of the content data at that time.

Upon receipt of the next reproduction request of the content data from the portable terminal, the HDD recorder encodes its initial portion at real time in the acquired parameters and transmits the same.

Third Embodiment

Figure 17:
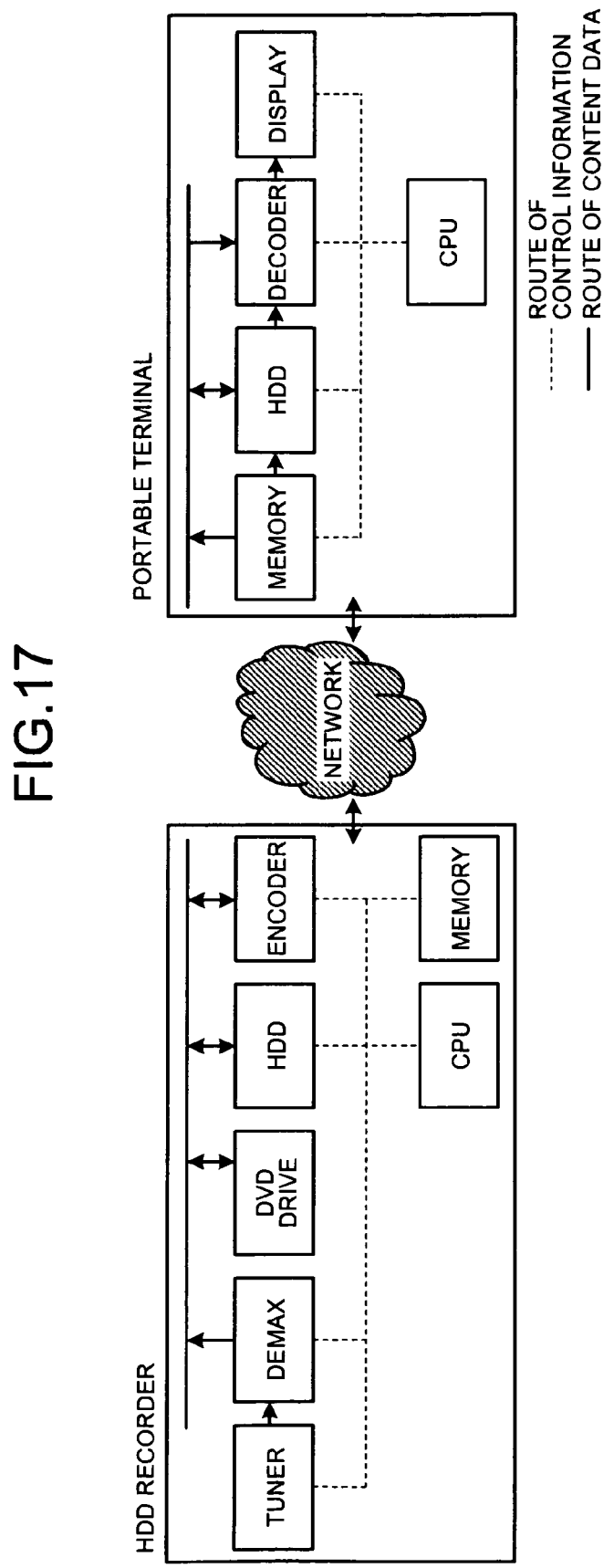
FIG. 17 is a view showing the outline of a third embodiment of a contents transmitting system according to this invention.

FIG. 17 is a view showing the outline of a third embodiment of a contents transmitting system according to this invention. A third embodiment will be described, by way of example, when an HDD (hard disk) recorder is used as the server device 100 and a portable terminal for receiving the content data of the HDD recorder through a network (cellar phone network, wireless LAN, and the like) is used as the client device 200.

In the third embodiment, the case of encoding the initial portion of the previously encoded content data according to the first embodiment, then previously transmitting it to the portable terminal, and recording and storing it in its HDD or memory, will be described as one example.

At first, when the portable terminal transmits the content data reproduction request to the HDD recorder, the HDD recorder decodes the initial portion of the requested content data which has been already stored, to display it.

Upon receipt of the content data reproduction request, the HDD recorder transmits the content data other than the initial portion which has been already transmitted.

The portable terminal reproduces the initial portion of the stored content data, then, decodes it, and displays it.

When the content data is suspended, finished, or interrupted during its reproduction, the HDD recorder creates the initial portion of the content data for the next reproduction, similarly to the first embodiment.

After the creation, the HDD recorder transmits the data to the portable terminal. At the time of the next content data reproduction request, the portable terminal reproduces the initial portion of the content data previously stored.

Fourth Embodiment

Figure 18:
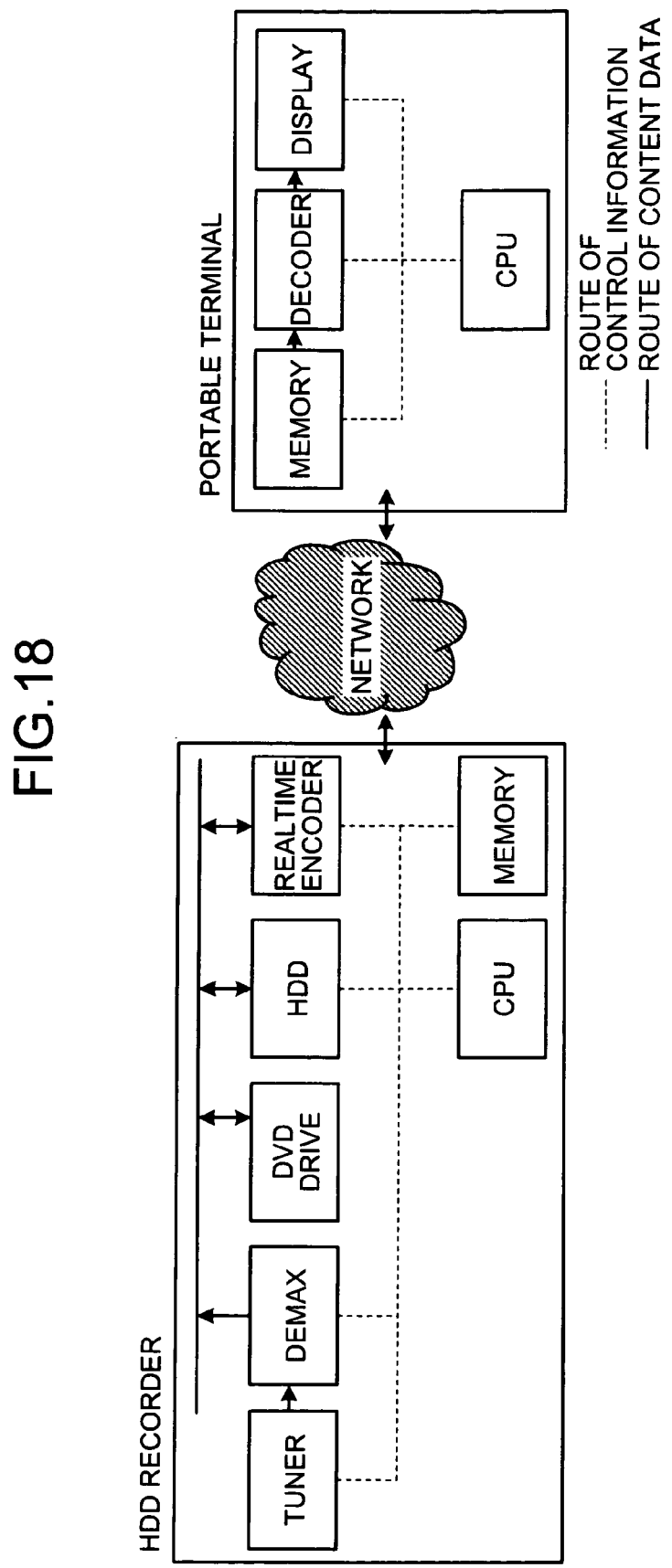
FIG. 18 is a view showing the outline of a fourth embodiment of a contents transmitting system according to this invention.

FIG. 18 is a view showing the outline of a fourth embodiment of a contents transmitting system according to this invention. A Fourth embodiment will be described, by way of example, when an HDD (hard disk) recorder is used as the server device 100 and a portable terminal for receiving the content data of the HDD recorder through a network (cellar phone network, wireless LAN, and the like) is used as the client device 200.

In the fourth embodiment, the case of performing a jump reproduction of directly reproducing the content data from an arbitrary position will be described as one example.

When the HDD recorder receives a reproduction request from a specified position of the content data from the portable terminal, the HDD recorder transmits the requested content data from the specified position to the portable terminal.

At this time, the HDD recorder encodes the content data from the specified position for an arbitrary time at real time and transmits the same.

The encode parameters are acquired from the previous encode rate information in the past transmission.

Then, the HDD recorder transmits the content data other than the above data for the arbitrary time from the specified position. The portable terminal receives the content data, decodes, and displays it.

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the server device 100 and the client device 200 are merely conceptual and may not necessarily physically resemble the structures shown in the drawings.

For example, the process functions performed by each device of the server device 100 and the client device 200, especially the each process function performed by the control unit, can be entirely or partially realized by CPU and a computer program executed by the CPU or by a hardware using wired logic. The computer program, recorded on a recording medium to be described later, can be mechanically read by the server device 100 and the client device 200 as the situation demands.

In other words, the storage unit such as ROM or hard disk (HD) stores the computer program that can work in coordination with the operating system (OS) to issue commands to the CPU and cause the CPU to perform various processes. The computer program is first loaded to the RAM, and forms a control unit in collaboration with the CPU.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a fixed mounted type such as ROM, RAM, HD which are built-in various computer system, or a communication medium that stores the computer program for a short term such as communication channels or carrier waves that transmit the computer program over networks such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

INDUSTRIAL APPLICABILITY

As described above, the present invention provides a server device in a contents transmitting system and a contents transmitting method which can shorten the time up to the reproduction of the content data, reserve the time to the interruption of the reproduction for a long time, and reduce user's stress in waiting for the reproduction at the reproduction time.

The invention claimed is:

1. A server device in a contents transmitting system including the server device and a client device connected to each other through a network in a communicable way, for transmitting content data recorded in the server device to the client device, the server device comprising:
    an encode parameter deciding unit that decides encode parameters of a reproduction start portion of the content data so as to be a different encode rate from an encode rate for a transmission bandwidth in the network, wherein the encode parameters are decided by the encode parameter deciding unit such that an average encode rate in a reproduction time of the reproduction start portion becomes lower than the encode rate for the transmission bandwidth in the network;
    an encoder that encodes the reproduction start portion with the encode parameters; and
    a recording unit that stores the reproduction start portion encoded in the encoder;
    wherein the server device transmits the reproduction start portion stored in the recording unit to the client device, when the server device receives a reproduction request of the content data from the client device, encodes the portion other than the reproduction start portion of the content data at the encode rate for the transmission bandwidth in the network, and transmits the encoded portion to the client device.

2. The server device according to claim 1, wherein the encode parameter deciding unit decides the encode parameters so as to increase the encode rate according to elapse of the reproduction time of the reproduction start portion.

3. The server device according to claim 1, wherein the encode parameter deciding unit decides the encode parameters previously set as the encode parameters of the reproduction start portion.

4. The server device according to claim 1, further comprising:
    a history recording unit that stores the encode rate in the past transmission of the other content data other than the above content data as encode rate information, wherein the encode parameter deciding unit decides the encode parameters in the reproduction start portion based on the encode rate information stored in the history recording unit.

5. The server device according to claim 4, wherein the encode parameter deciding unit decides the encode parameters in the reproduction start portion based on the content data information obtained by analysis of the content data and the encode rate information stored in the history recording unit.

6. The server device according to claim 1, further comprising:
a history recording unit that stores encode rate information of the content data when end, suspension, or interruption of the content data occurs, wherein
the encode parameter deciding unit decides the encode parameters in the reproduction start portion based on the encode rate information stored in the history recording unit.

7. The server device according to claim 6, wherein the encode parameter deciding unit decides the encode parameters in the reproduction start portion based on the content data information obtained by analysis of the content data and the encode rate information stored in the history recording unit.

8. A contents transmitting method using a contents transmitting system including a server device and a client device connected to each other through a network in a communicable way, for transmitting content data recorded in the server device to the client device, the method comprising:
an encode parameter deciding step of deciding encode parameters of a reproduction start portion of the content data so as to be a different encode rate from an encode rate for a transmission bandwidth in the network, wherein the encode parameters are decided by the encode parameter deciding step such that an average encode rate in a reproduction time of the reproduction start portion becomes lower than the encode rate for the transmission bandwidth in the network;
an encode step of encoding the reproduction start portion with the encode parameters; and
a recording step of storing the reproduction start portion encoded in the encode step;
wherein the server device transmits the reproduction start portion stored in the recording step to the client device, when the server device receives a reproduction request of the content data from the client device, encodes the portion other than the reproduction start portion of the content data at the encode rate for the transmission bandwidth in the network, and transmits the encoded portion to the client device.

\* \* \* \* \*